(12) United States Patent
Nark et al.

(10) Patent No.: US 8,782,960 B2
(45) Date of Patent: Jul. 22, 2014

(54) METHOD OF SECURING A CABLE TO A ROOF

(76) Inventors: Malcolm Brent Nark, Aurora, CO (US); Bronson Rumsey, Neponset, IL (US); Edwin Peterson, Neponset, IL (US)

( * ) Notice: Subject to any disclaimer, the term of this patent is extended or adjusted under 35 U.S.C. 154(b) by 487 days.

(21) Appl. No.: 12/852,676

(22) Filed: Aug. 9, 2010

(65) Prior Publication Data

US 2011/0209434 A1 Sep. 1, 2011

Related U.S. Application Data

(63) Continuation-in-part of application No. 12/765,140, filed on Apr. 22, 2010, now Pat. No. 8,490,336, which is a continuation-in-part of application No. 12/686,578, filed on Jan. 13, 2010, now Pat. No. 8,205,397, which is a continuation-in-part of application No. 12/547,227, filed on Aug. 25, 2009, now Pat. No. 8,191,319.

(51) Int. Cl.
   *E04B 7/00* (2006.01)

(52) U.S. Cl.
   USPC .................................. 52/13; 219/213; 52/94

(58) Field of Classification Search
   USPC ........ 52/95, 15, 16, 96, 94, 97, 173.1, 11, 13; 219/213, 200, 201, 520, 521; 248/48.1, 248/48.2
   See application file for complete search history.

(56) References Cited

U.S. PATENT DOCUMENTS

| | | |
|---|---|---|
| 2,699,484 A | 1/1955 | Michaels |
| 3,074,676 A | 1/1963 | Watson |
| 3,207,211 A | 9/1965 | Winterfeldt |
| 3,521,029 A | 7/1970 | Toyooka et al. |
| 4,189,881 A * | 2/1980 | Hawley .................... 52/91.3 |
| 4,848,051 A | 7/1989 | Weisner et al. |
| 5,391,858 A | 2/1995 | Tourangeau et al. |
| 5,496,005 A | 3/1996 | Dieringer |
| 5,829,206 A | 11/1998 | Bachman |
| 5,836,344 A | 11/1998 | Hovi, Sr. |
| 6,225,600 B1 | 5/2001 | Burris |
| 6,499,259 B1 | 12/2002 | Hockman |
| 6,668,491 B1 | 12/2003 | Bonerb |
| 6,759,630 B1 | 7/2004 | Tenute |
| 6,852,951 B2 | 2/2005 | Heise |
| 7,071,446 B1 | 7/2006 | Bench |
| 7,104,012 B1 | 9/2006 | Bayram |
| 7,104,013 B1 | 9/2006 | Gates et al. |

(Continued)

FOREIGN PATENT DOCUMENTS

JP 2004100302 4/2004

OTHER PUBLICATIONS

Victorian Metal Shingle, Snow Belt System, 3 pages, offered for sale on or before Aug. 24, 2008.

(Continued)

*Primary Examiner* — Branon Painter
(74) *Attorney, Agent, or Firm* — Francis Marino

(57) ABSTRACT

On a roof having a raised seam, a method of securing a cable comprises extending a first run of cable in a direction generally parallel to the raised seam. In accordance with the method a cover is accessed having a channel dimensioned to receive the cable therein. The cover is installed on the roof at the raised seam. The cable is secured in the channel of the cover.

18 Claims, 14 Drawing Sheets

(56) References Cited

U.S. PATENT DOCUMENTS

| | | |
|---|---|---|
| 7,287,354 B2 | 10/2007 | Rivers et al. |
| 7,448,167 B2 | 11/2008 | Bachman |
| 7,681,363 B2 * | 3/2010 | Banister .................. 52/173.3 |
| 2001/0025839 A1 | 10/2001 | Jones |
| 2004/0140002 A1 | 7/2004 | Brown et al. |
| 2005/0139585 A1 | 6/2005 | Knappmiller |
| 2006/0037252 A1 | 2/2006 | Gosse et al. |
| 2006/0096968 A1 | 5/2006 | Livermore |
| 2006/0196124 A1 | 9/2006 | Bachman |
| 2006/0213129 A1 | 9/2006 | Bachman |
| 2006/0277831 A1 | 12/2006 | Bachman |
| 2008/0196352 A1 | 8/2008 | Grove |
| 2008/0302928 A1 | 12/2008 | Haddock |
| 2011/0047892 A1 | 3/2011 | Nark |
| 2011/0047927 A1 | 3/2011 | Nark |
| 2011/0047930 A1 | 3/2011 | Nark |
| 2011/0049118 A1 | 3/2011 | Nark |

OTHER PUBLICATIONS

Heat-line Freeze Protection Systems, Edge-Cutter(R) Roof De-icing System, Product Brochure, 2006, 4 pages.

Raychem Corporation, IceStop GMK-RC Roof Clip and GM-RAKE Hanger Braket, product brochure, Mar. 1999, 4 pages.

Raychem Corporation, IceStop product information sheet, Oct. 1984, 1 page.

Chromalox®, Edge-Cutter® Roof De-Icing System product brochure, 2 pages, published on or before Aug. 24, 2008.

\* cited by examiner

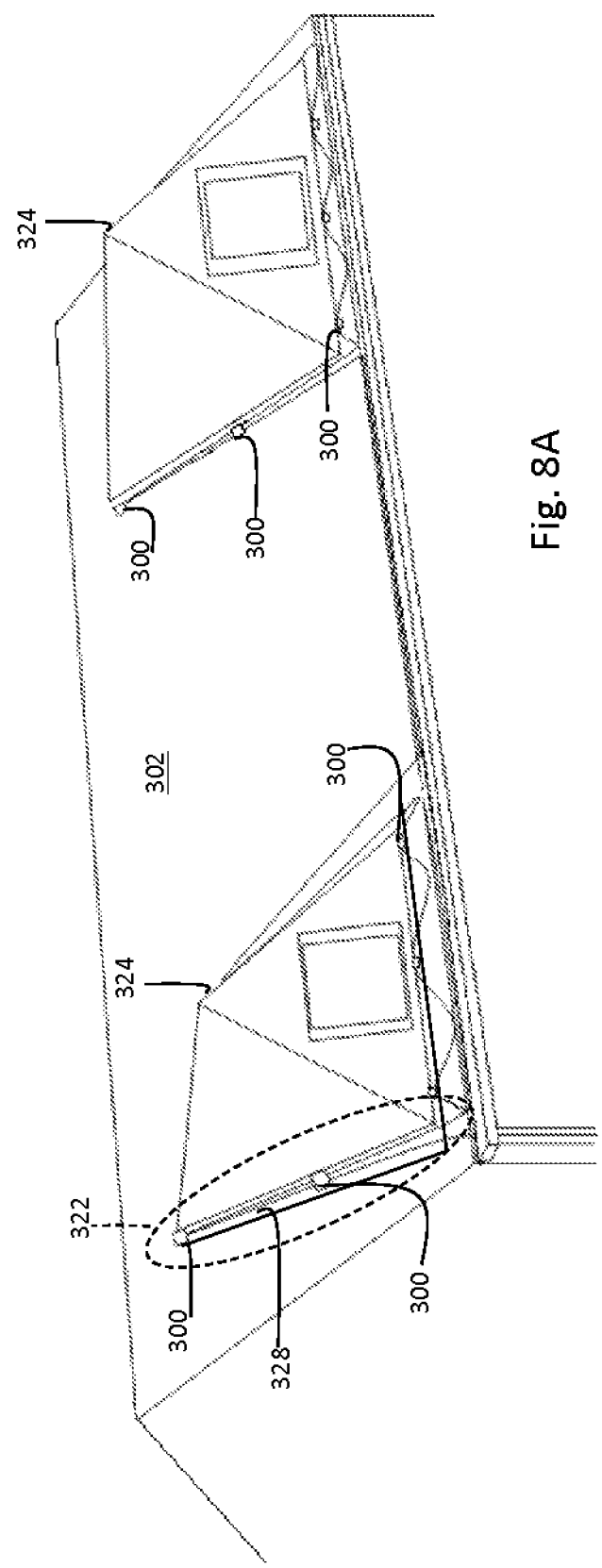

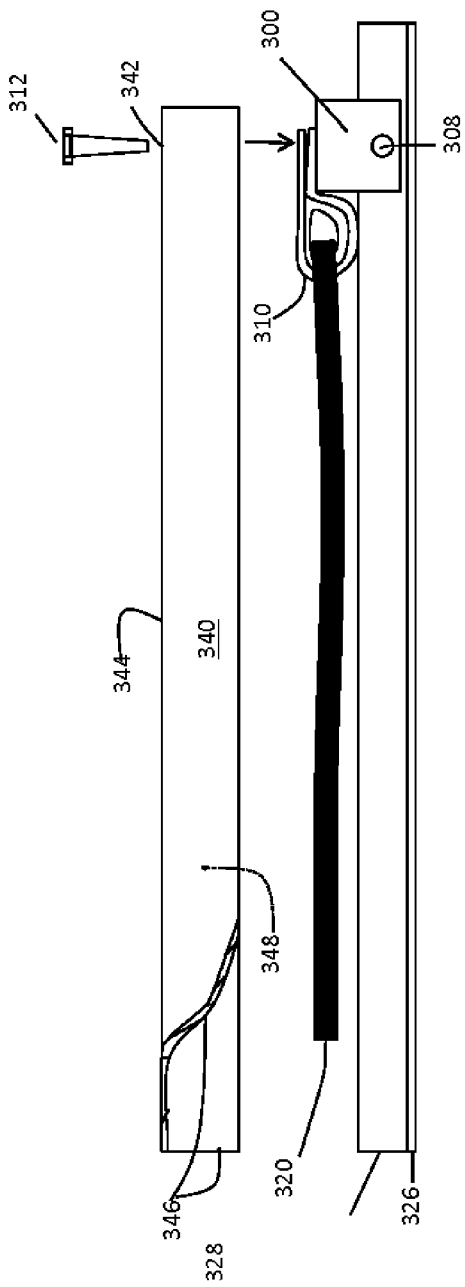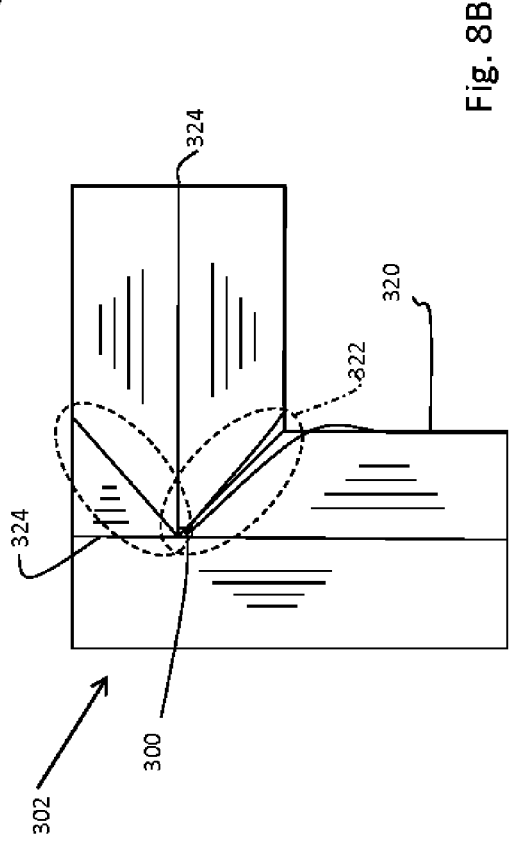

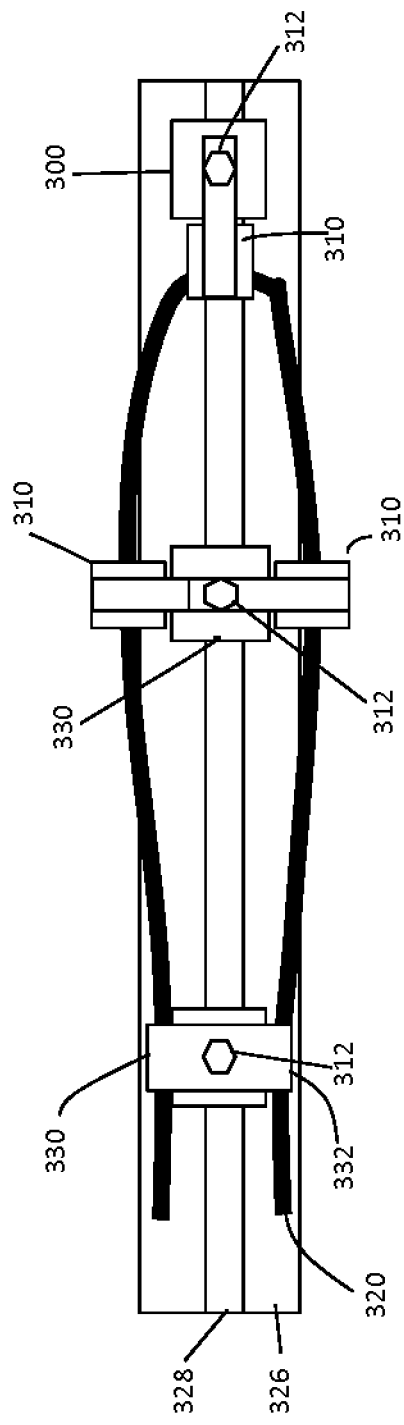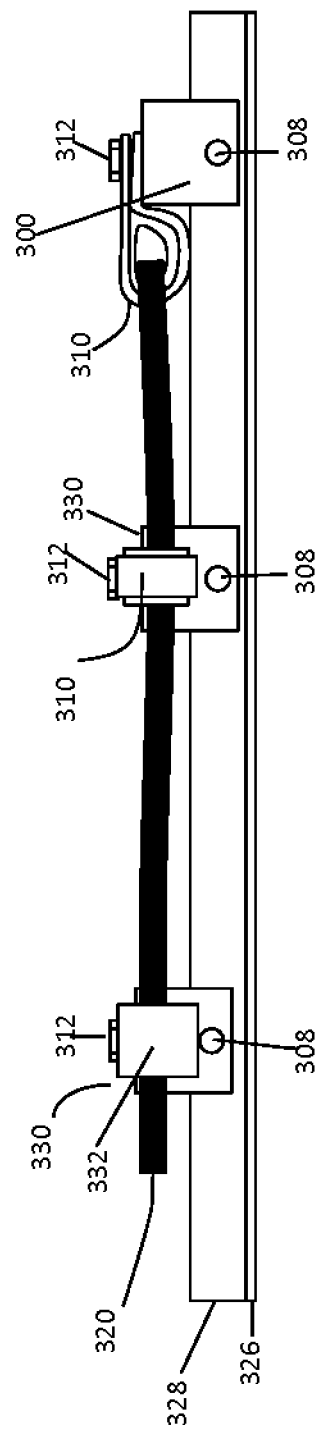

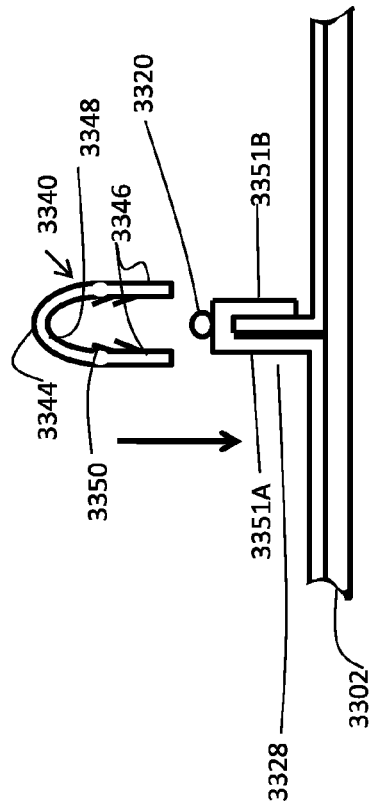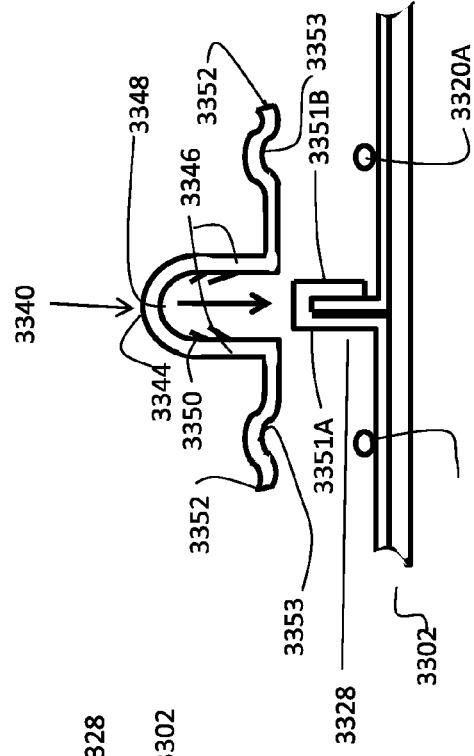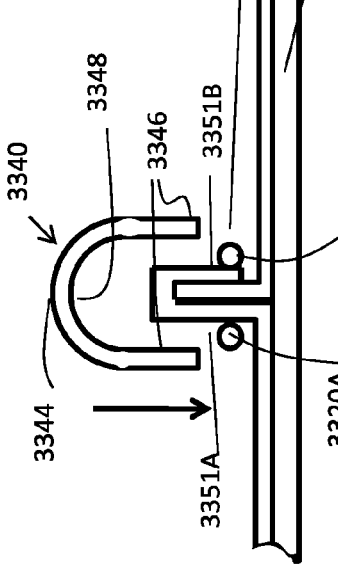

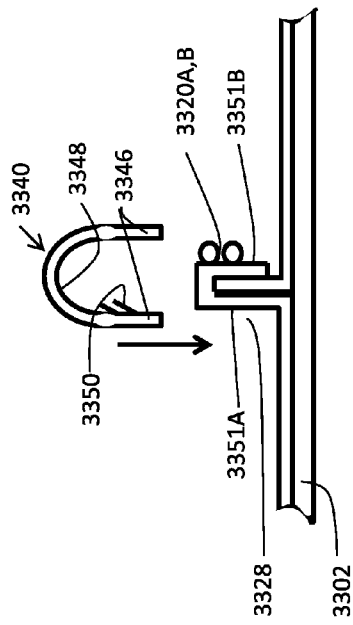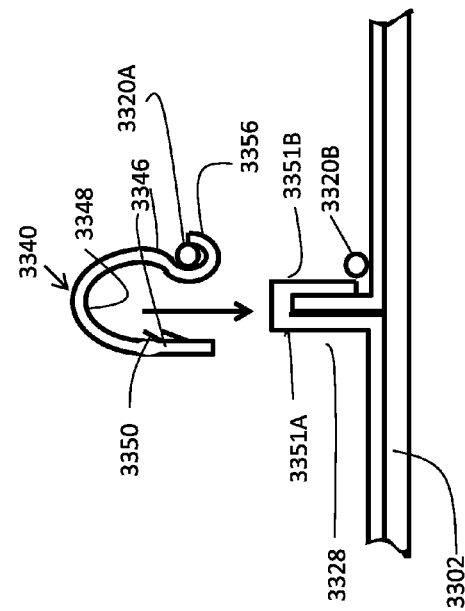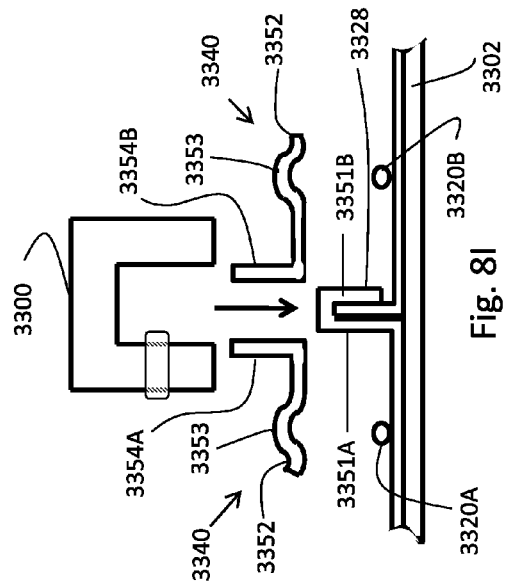

METHOD OF SECURING A CABLE TO A ROOF

RELATED APPLICATION DATA

This application is a continuation-in-part of application Ser. No. 12/765,140; filed Apr. 22, 2010, currently pending, which is a continuation-in-part of application Ser. No. 12/686,578; filed Jan. 13, 2010, currently pending, which is a continuation-in-part of application Ser. No. 12/547,227, filed Aug. 25, 2009, currently pending, the disclosures of which are incorporated by reference herein.

BACKGROUND

This disclosure relates to a cable raceway that forms a channel for accommodating a cable at an edge of a roof, in a valley of a roof, and adjacent a raised seam on an roof. The raceway may accommodate a heating cable that melts snow and ice on a roof and otherwise prevents ice from accumulating on roof eaves. Although the disclosure is more focused toward a heating cable application, the raceway may also be used for other low voltage wiring applications like running security or audio wires.

BRIEF DESCRIPTION OF THE DRAWINGS

Further detail of the disclosed embodiments follows in the detailed description below and is shown in the accompanying drawings wherein:

FIG. 8A is a partial perspective view of a structure with a roof with converging roof surfaces with heating cable installed thereon;

FIG. 8B is a top elevational view of a structure with converging roof surfaces with a heating cable installed thereon;

FIG. 8C is sectional top view of flashing used in area where two roof structures converge;

FIG. 8D is a side view of the flashing section of FIG. 8C;

FIG. 8E is a sectional side exploded view of a flashing assembly comprising a cover and the general arrangement of the flashing section of FIG. 8D, with an end portion of the cover shown in section to illustrate its preferred cross sectional arrangement;

FIG. 8F is a cross sectional view of a raised seam metal roof showing an arrangement where the heating cable is positioned atop the raised seam with a cover;

FIG. 8G is an alternate configuration to that shown in FIG. 8F where one run of heating cable is positioned on a first side of the raised seam and a second run on heating cable is positioned on an second side of the raised seam within a cover;

FIG. 8H is an alternate configuration to that shown in FIG. 8F where a cover has extended flank portions on each side of the raised seam and one run of heating cable is positioned on one of the flank portions and a second run of heating cable is positioned on the opposite flank portion;

FIG. 8I is an alternate configuration to that shown in FIG. 8H where a cover comprises two generally "L"-shaped portions with one "L"-shaped portion on each side of the raised seam and one run of heating cable is positioned adjacent one "L"-shaped portion and a second run of heating cable is positioned adjacent the other "L"-shaped portion;

FIG. 8J is an alternate configuration to that shown in FIG. 8F where two runs of heating cable are positioned on one side of the raised seam within a cover;

FIG. 8K is an alternate configuration to that shown in FIG. 8F where two runs of heating cable are positioned on one side of the raised seam with one run on an exposed lower edge of a cover and the second run below the exposed lower edge of the cover;

DETAILED DESCRIPTION OF THE EMBODIMENTS

Figure 1:
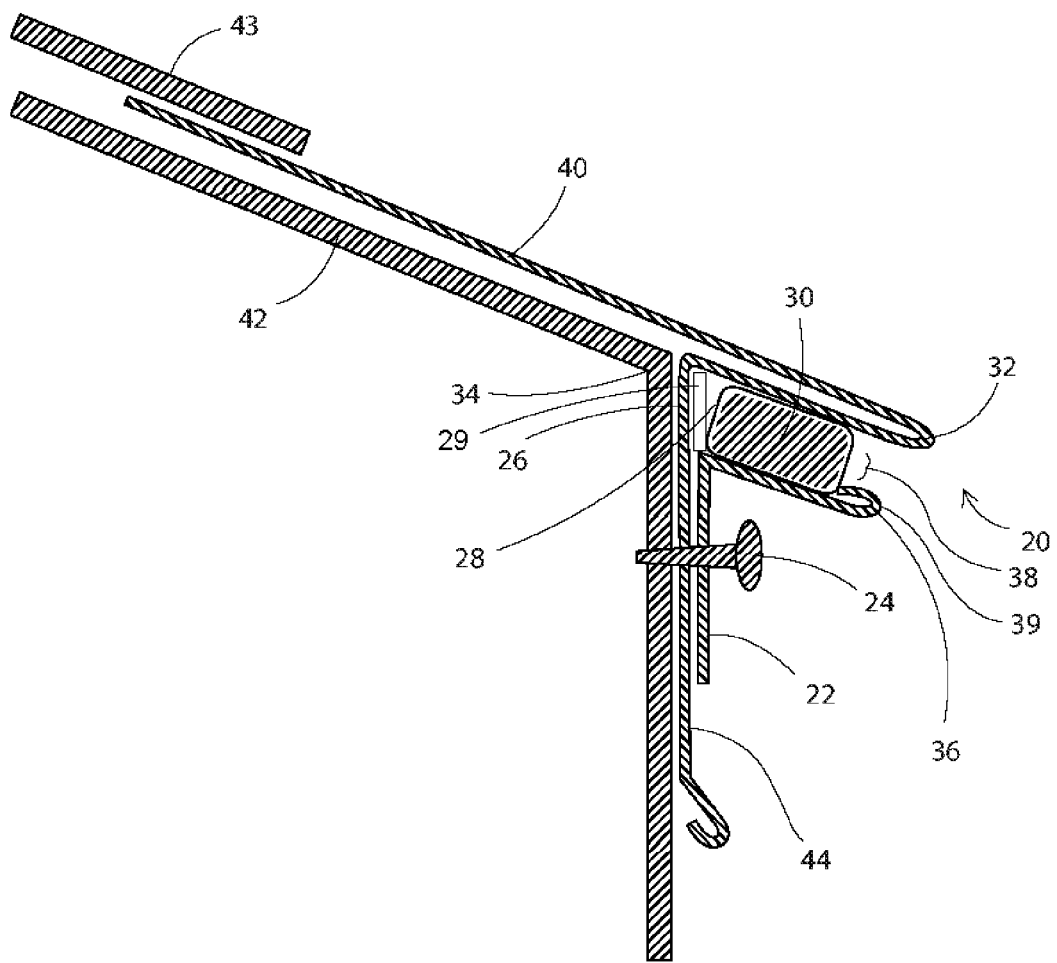
FIG. 1 is a schematic drawing showing a roof edge cable raceway comprising an edge attachment assembled with an overhanging drip edge mounted on an edge of a roof of a structure to form an open channel for housing a heating cable.

Often, ice dams form in very cold climates on the roof of a structure. The heat from inside the structure combined with ambient heat from sunlight will cause snow and ice from the upper roof to melt and drain as water to the roof overhang. Oftentimes, the roof overhang is colder than the upper roof because the underside of the roof overhang is not heated and sees no direct sunlight. This causes the melting snow and ice from the upper roof to refreeze at the roof edge causing an ice dam. An ice dam often causes the draining melting snow and ice to pool. Often, the pooling water backs up behind the ice dam and leaks into the structure causing damage to walls, ceilings, insulation, and electrical systems. The water can also lead to environmental issues such as mold and mildew. Often, an ice dam causes the formation of icicles at an edge of a structure that cause a hazard.

Generally speaking, correct roof drainage requires about a three-quarter inch additional overhang of roofing material from the structure front face (facia board) to ensure drainage water flows into a gutter positioned adjacent to an edge of a roof of a structure. If the overhang is too short, melting snow and ice, and rain water will flow behind the gutter leading to rotted wood sheathing and facia, stained siding, soil erosion at the foundation below and, potentially, flooded basements. In some construction techniques, asphalt roofs often have a three-quarter inch overhang of shingles to drain water into the gutters. In some construction techniques, shingle or shake roofs have a metal drip edge that acts as a support for the extended shingles or shakes, and the shingles or shakes completely cover the metal drip edge.

The roof edge cable raceway with an associated heating cable installed therein as described below prevents the formation of ice dams while improving the visual appearance of the structure in which the apparatus and heating cable is installed. The roof edge cable raceway described below may be used with many roofing types, including metal, raised seam metal, corrugated metal, shake, and conventional asphalt shingles, and may be used on residential housing, industrial buildings, bridges, electrical transformers, outdoor cabinets, enclosures and other structures. As described below and shown in FIGS. 1-7 and 10-15, the roof edge cable raceway forms a channel that extends along an edge of a roof of a structure. When a heating cable is installed in the channel, the effect of heat transfer from the cable to a heat conductive portion of the drip edge heats the edge of the roof sufficiently to prevent or melt any ice dams, thereby enhancing drainage of melting snow and ice and preventing the formation of icicles. As described below and shown in FIGS. 1-7 and 10-15, the roof edge cable raceway may comprise an edge attachment fitted to a drip edge, for instance, an existing overhanging drip edge already installed on an edge of a roof of a structure, or may comprise a drip edge, or an overhanging style drip edge, with an integrally formed (if not monolithically formed) open channel structure.

The roof edge cable raceway and open channel structure may be configured to house a resistance-type heating cable, or a self-regulating heating cable, or other low voltage style cabling applications, for instance, cables used for lighting, security cameras or audio speakers. Generally speaking, in a heating cable application as described below, the heating cable must have a snug fit in the channel to maximize heat transfer from the heating cable to the roof. Although not necessary, the entire roof edge cable raceway may be formed from a heat conductive material to simplify construction. In the alternative, the side of the channel adjacent the edge of the roof, and the portion of the roofing materials in contact therewith may be formed from a heat conductive material to allow heat transfer to the area adjacent the roof edge, or in an alternate use where heat transfer is not critical, i.e., low voltage style cabling applications, the raceway may be formed of plastic or PVC materials.

As an example, and not in any limiting sense, FIGS. 1-5 show various embodiments of a roof edge cable raceway 20 used to form an open channel structure along an edge of a roof of a structure in which a heating cable is housed. The heating cable transfers heat directly to a heat conductive portion of the roof edge cable raceway preventing ice build-up at the drip edge and the formation of ice dams on the roof edge. Heat from the cable is concentrated at the drip edge. The open channel structure allows ready replacement and inspection of the heating cable. The channel is defined by channel sides that preferably extend along the length of the channel and define an opening into the channel. The channel may extend along the entire length of the roof edge or a portion of the roof edge desired to be heating.

FIG. 1 shows a roof edge cable raceway 20 comprising an edge attachment 22 assembled with mechanical fasteners 24 to an overhanging drip edge 26 to form a channel 28 for housing a heating cable 30. The channel 28 has a first side 32 positioned adjacent a roof edge 34 and a second channel side 36 spaced therefrom. Together, the channel sides 32,36 define an opening 38 for the channel 28. The open channel 28 allows replacement and inspection of the heating cable 30 through the opening 38 from a position in front of the channel opening. As shown in FIG. 1, the second channel side 36 may be formed by mounting the edge attachment 22 at a position sufficient to allow the cable 30 to be visible in the opening 38 of channel from a position in front of the channel while allowing the sides of the channel to be urged against the cable with a snug fit to removably secure the cable in the channel. The second channel side 36 may comprise a radiused outer edge 39. The radiused outer edge provides additional resiliency to springably retain and/or removably secure the heating cable in the channel. The radiused outer edge also assists installation personnel in installing the heating cable in the channel. Although the radiused outer edge 39 is shown in FIG. 1, the distal edge of the edge attachment may also be flat without a radius.

As described above, the edge attachment functions as a biasing member urging the heating cable upward in FIG. 1 toward the channel first side. However, this may be reversed and the channel first side may function as a biasing member urging the heating cable downward in FIG. 1 toward the edge attachment. In the alternative, the biasing member may be a separate resilient member that is inserted in the channel, for instance, below the cable to urge the cable upward in FIG. 1 toward the channel first side. The separate resilient member may comprise a wave form elongated member disposed in the channel adjacent one or both of the channel sides; a foam rubber material disposed in the channel adjacent one or both of the channel sides; rubber, silicone, or plastic inserts that extend along the channel sides and/or engage one or both of the channel sides; or rubber, silicone, or plastic inserts periodically spaced along the length of the channel sides, for instance, in openings in one or both of the channel sides. The biasing member may be made from a heat conductive material to maximize heat transfer from the cable to the adjacent roof structure. The drawings show a relatively simplified construction of the raceway, involving less components, where one or both of the channel sides is formed to be resiliently deflected or springably moved to allow the heating cable to be removably secured in the channel.

The first channel side (i.e., the channel side adjacent the roof edge) 32 has a roof engagement portion 40 extending therefrom adapted to overlie and be secured to a portion 42 of the roof of the structure adjacent the roof edge 32. As shown in FIG. 1, the roof engagement portion 40 may also extend beyond the roof edge to form the overhanging portion of the drip edge. While the roof engagement portion of FIG. 1 has an exposed lower part with shingles or shakes 43 covering an upper part of the roof engagement portion, additional row(s) of shingles or shakes may cover the lower exposed part of the roof engagement portion and may extend to or beyond the roof edge thereby covering a majority or all of the roof engagement portion, as may be desired depending upon the construction techniques used. Drain slots (not shown) may be provided through the roof engagement portion, for instance, the lower portion of the roof engagement portion that forms the drip edge, and into the channel so that water may drain from under the lower shingles. A fascia mounting portion 44 may extend from the first channel side 32 in a direction generally transverse to the roof engagement portion 40, and the edge attachment 22 forming the second channel side may be mounted thereto.

The overhanging style drip edge (or drip edge) may comprise a pre-existing installation on the edge of the roof of the structure, thus allowing one to secure the edge attachment to the overhanging drip edge to form the channel, for instance in a retrofitting type of application. In this regard, the edge attachment 22 may comprise a member with a generally L-shaped cross-section that is mounted below the overhanging drip edge with a space therebetween that forms the channel 28. While FIG. 1 shows the use of mechanical fasteners 24 to secure the edge attachment to the facia board to form the channel, other methods may be used, including providing the facia mounting portion of the overhanging drip edge with a system of locking tabs that cooperate with the edge attachment to secure the edge attachment in the proper location to form a channel suitable for housing the heating cable.

Using an edge attachment comprising a member having a generally L-shaped cross-section allows flexibility for the scope of work to be performed by on-site metal fabricators. For instance, on-site metal fabricators may form the edge attachment and install the edge attachment on the existing structure to form the open channel at the necessary dimensions to snugly fit the heating cable in the channel, and then the heating cable may then be installed in the open channel. To assist in mounting the edge attachment at the required spacing so that the channel accommodates the heating cable with a snug fit, the generally "L"-shaped edge attachment 22 may have a removable, and/or detachable (i.e., "knock-out" style) tab 29 projecting from its corner. In the alternative, the heating cable may be positioned adjacent the roof edge and then the edge attachment installed with the cable in place. As another example, the edge attachment may be mounted to an preexisting F-style overhanging drip edge installed on the structure. In the alternative, on site-metal fabricators may install the F-style overhanging drip edge and then the edge attachment. In the alternative, on-site metal fabricators may bend sheets of flat or rolled flashing materials as necessary to form and then install an overhanging drip edge and edge attachment. Various other combinations and sequences are also possible depending upon whether the work involves new construction, or remodeling or retrofitting of an existing structure.

Generally, the drip edges, such a F-style overhanging drip edges, comprise aluminum materials, for instance, extruded aluminum materials. Flashing generally also comprises aluminum sheets or rolls of aluminum. By closely mounting the edge attachment to the overhanging drip edge, the edge attachment and/or overhanging drip edge may be resiliently deflected or springably moved slightly to allow the heating cable to be snugly fit therebetween. As discussed before, forming a radiused outer edge 39 on the edge attachment provides additional resiliency for snugly retaining and/or removably securing the heating cable in the channel. Additionally, when replacement of the cable is needed, the cable may be removed by pushing the channel sides to an apart position an amount sufficient to release the cable from the channel through the opening without mechanical deformation of the edge attachment or drip edge. A new heating cable may be then be readily installed using the existing raceway by moving the channel sides to an apart position to allow the new heating cable to inserted through the opening into the channel. Alternatively, mechanical fasteners holding the edge attachment in place may be removed (or loosened if the edge attachment is provided with elongated or "peanut-shaped" holes) thereby allowing the heating cable to be removed. A new heating cable may then be installed in the channel using one of the aforementioned methods.

The tight contact between the heating cable and the channel sides allows heat transfer through the heat conductive materials (i.e., aluminum) from the cable to a heat conductive portion of the roof edge cable raceway to a portion of the roof adjacent the drip edge, thus enabling the drip edge to be heated sufficiently to prevent ice formation at the edge of the roof of the structure. However, it is not necessary that the edge attachment be formed from a heat conductive material. Rather, the roof engagement portion and the channel first side may be made from a heat conductive material to allow heat transfer from the heating cable to the underside of the roofing materials for heating at the roof edge, and the edge attachment as well as the fascia engagement portion may be made from a different material.

Figure 2:
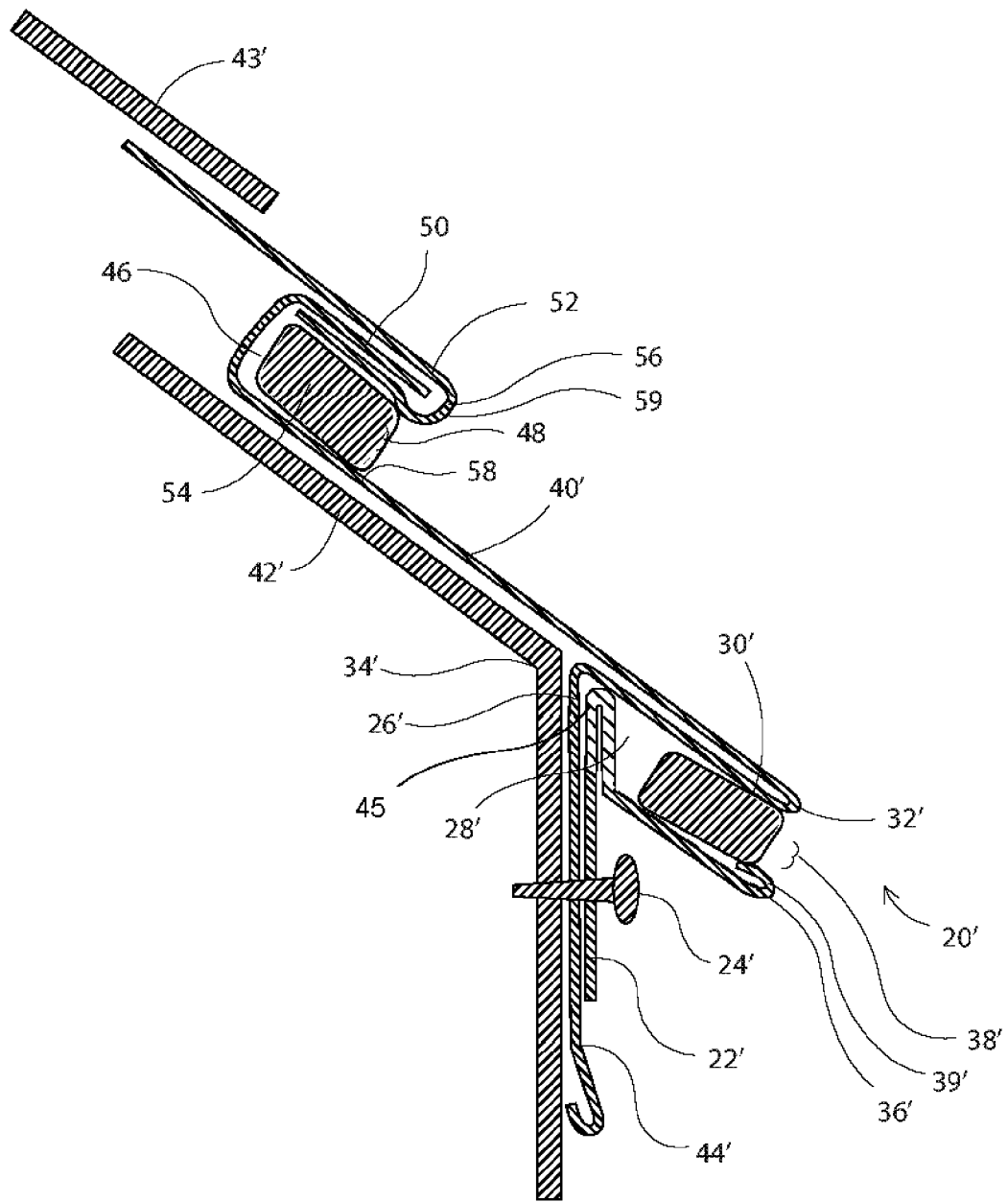
FIG. 2 is a schematic drawing showing an alternate embodiment of a roof edge cable raceway comprising the edge attachment of FIG. 1 and an overhanging drip edge with a second channel formed in a roof engagement portion of the overhanging drip edge for housing a second heating cable.

FIG. 2 shows an alternate embodiment of a roof edge cable raceway having the same basic arrangement of that of FIG. 1. In that regard, elements appearing in FIG. 2 that are related to those of FIG. 1 will be indicated with a ('). As with the embodiment of FIG. 1, the edge attachment 22' is assembled with mechanical fasteners 24' to the fascia mounting portion 44' of the overhanging drip edge 26' to form the channel structure 28' for spingably retaining and/or removably securing the heating cable 30', and the channel has a first side 32' positioned adjacent the roof edge 34' and a second side 36' spaced therefrom defined by the mounted position of the edge attachment 22'. The second channel side 36' may have a radiused outer edge 39'. Together the first and second sides 32',36' define an opening for the channel. As with the embodiment of FIG. 1, the channel first side 32' has a roof engagement portion 40' extending therefrom up the roof 42' and beyond the roof edge 34' to form the overhanging portion of the drip edge. Also as with the embodiment of FIG. 1, shingles or shakes 43' do not extend to the roof edge and a lower part of the roof engagement portion is exposed. Also, as with the embodiment of FIG. 1, a fascia mounting portion 44' may extend from the channel first side in a direction generally transverse to the roof engagement portion with the edge attachment 22' forming the second channel side may be mounted thereto.

However, in the embodiment of FIG. 2, a spacer 45 is integrally formed on the edge attachment 22' to assist in locating the edge attachment at the proper spacing to form the channel opening 38' to accommodate the heating cable, rather than the tab of FIG. 1. Although not shown in the drawings, the generally "L"-shaped edge attachment of FIG. 1 may be similarly configured with an integrally formed spacer. Also, in the embodiment of FIG. 2, the roof engagement portion 40' is provided with a second channel 46 having an opening 48 at an upper portion 50 of the roof engagement portion. The opening 46 of the channel 48 may be formed by overlapping the upper portion 50 of the roof engagement portion 40'. An additional section of flashing material 52 may interlock with the upper portion 50 in the second channel 46 and may extend under the roofing materials 43' (i.e., shingles, shakes, etc.) (not shown) a further distance up the roof 42' from the edge 34' of the roof of the structure. The second open channel 46 a houses a second heating cable 54 to increase the area of snow and ice that may be melted at the edge of the roof of the structure. Channel sides 56,58 define the second channel opening 48, and at least one of the sides 56,58 of the second channel is sufficiently resilient to allow the heating cable 54 to be inserted through the opening into the second channel 46 in manner to allow the heating cable to be secured in the second channel with the heating cable being visible through the opening from a position in front of the opening of the second channel. For instance, as shown in FIG. 2, the second channel first side 56 may have a relatively large radiused edge 59 to assist in providing added resiliency for the second channel first side to springably retain and/or removably secure the second heating cable 54 in the second heating channel. This radius feature may be reversed and provided on the second channel second side. Although FIG. 2 shows the added flashing 52 interlocking with the roof engagement portion 40', it should be appreciated that the second channel 46 may be monolithically formed with the roof engagement portion of the overhanging drip edge and/or monolithically formed with the added flashing. Additionally, it should be appreciated that a biasing member may be provided in a manner as previously described in one or both of the first and second channels to assist in removably securing a cable therein.

Figure 3:
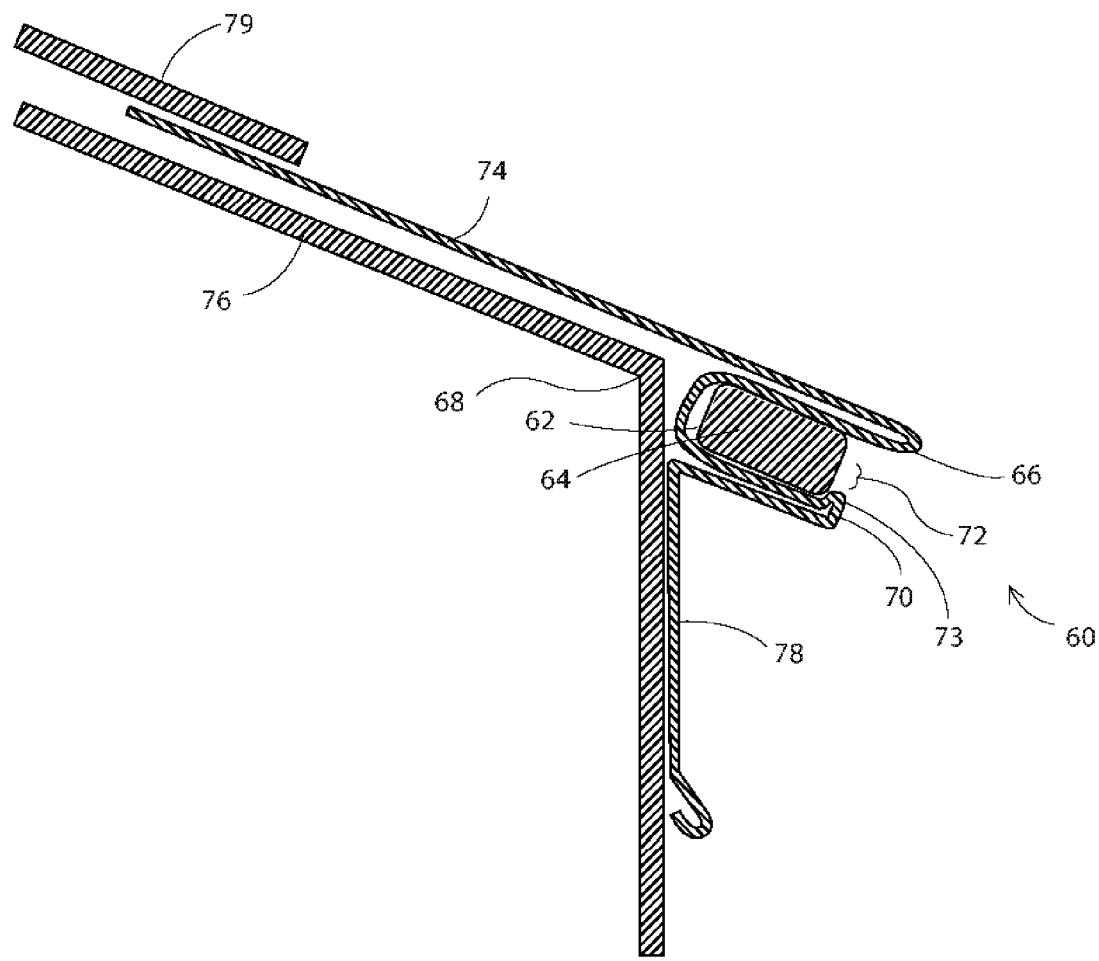
FIG. 3 is a schematic drawing showing an alternate embodiment of a roof edge cable raceway mounted on an edge of a roof of a structure with a monolithically formed open channel for housing a heating cable.

FIG. 3 shows a roof edge cable raceway 60 with a monolithically formed channel 62 that is pre-formed for a heating cable 64. The channel 62 has a first side 66 positioned adjacent a roof edge 68 and a second side 70 spaced therefrom. Together the channel sides 66,70 define an opening 72 into the channel 62, and one or more of the channel sides may be sufficiently resilient to be springably moved to allow insertion of the heating cable 64 through the opening 72 into the channel 68 in a manner to allow securing the heating cable in the channel with the heating cable being visible through the opening from a position in front of the opening. The resiliency of the channel sides also allows replacement of the heating cable without deformation of the channel. The channel second side 70 may have a relatively large radiused edge 73 to assist in providing added resiliency for the channel second side to springably retain and/or removably secure the second heating cable 54 in the second heating channel. It should be appreciated that a biasing member may be provided in a manner as previously described in the channel to assist in removably securing a cable therein. The roof edge cable raceway 60 may comprise a roof engagement portion 74 that is adapted to overlie and be secured to a portion 76 of a roof of the structure on the channel first side, and a facia engagement portion 78 extending from the channel second side. The roof engagement portion may also extend beyond the roof edge 68 to form an overhanging roof edge. Preferably, the roof engagement portion 74, the fascia engagement portion 78, and the channel sides 66,70 are monolithically formed. In the alternative, the roof engagement portion and the channel first side may be made from a heat conductive material to allow heat transfer from the heating cable to the underside of the roofing materials 79 for heating at the roof edge, and the fascia engagement portion may be made from a different material. The embodiment of FIG. 3 may also be provided with a second channel (not shown) on the roof engagement portion similar in arrangement to that of FIG. 2 or a second channel monolithically formed with the roof engagement portion in the manner mentioned previously. Also, the embodiment of the roof edge cable raceway of FIG. 3 may be extruded as a monolithic member or may be formed on-site by metal fabricators bending flashing as needed into the form as shown FIG. 3 in the manner mentioned previously.

Figure 4:
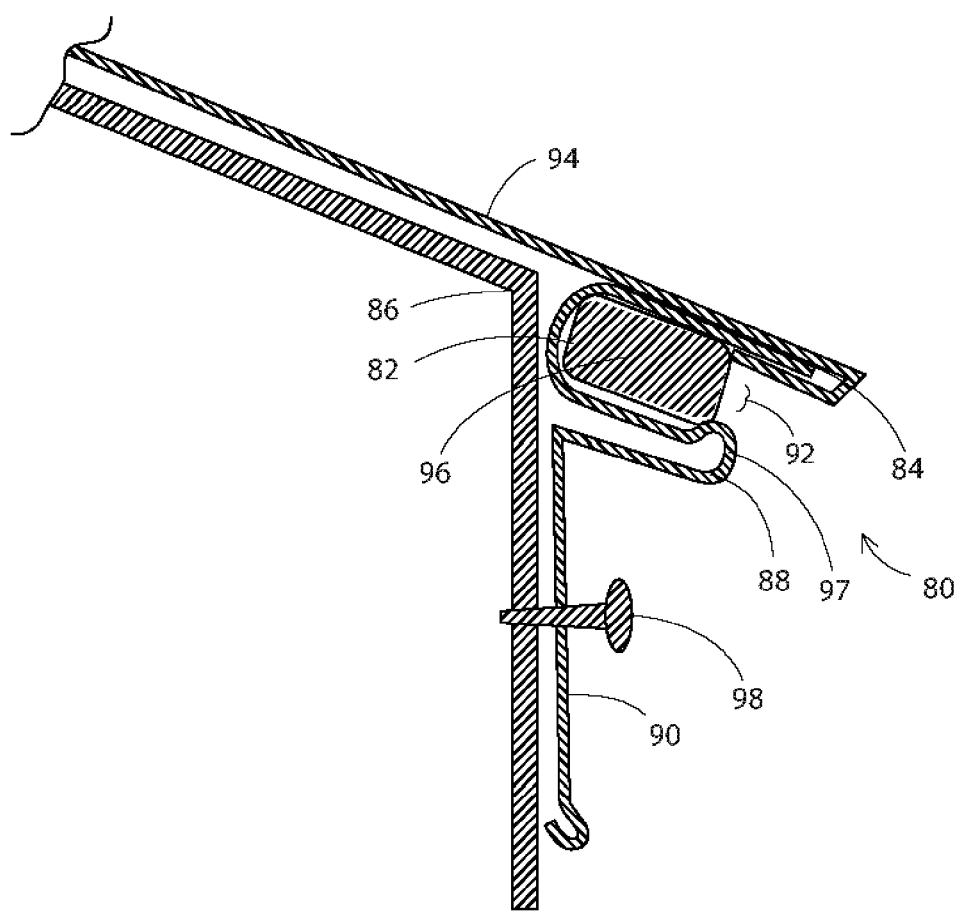
FIG. 4 is a schematic drawing showing an alternate embodiment of roof edge cable raceway mounted on an edge of a roof of a structure with a J-shaped cross-section adapted for housing a heating cable.

FIG. 4 shows an alternate embodiment of a roof edge cable raceway 80 comprising a open J-style channel. In the embodiment shown in FIG. 4, a channel 82 is formed monolithically with a first side 84 of the channel adjacent a roof edge 86 and an opposite, second side 88 of the channel having a facia engagement portion 90 extending therefrom. Together, the channel sides 84,88 define an opening 92 extending along the length of the channel 82. The channel first side 84 may engage roofing materials 94, for instance, a metal roof. As described previously, one or more of the channel sides 84,88 may be sufficiently resilient to be springably moved to allow insertion of a heating cable 96 into the channel 82 through the opening 92, while retaining the heating cable in the channel with a snug fit sufficient to allow heat from the cable to transfer to the channel and roof to prevent the formation of an ice dam. The channel second side may be provided with a large radiused outer edge 97 to assist in providing added resiliency for the channel second side to springably retain the heating cable 96 in the channel. The J-style open channel also allows the heating cable to be removably secured in the channel thereby allowing inspection and/or replacement at a later date as needed. It should be appreciated that a biasing member may be provided in a manner as previously described in the channel to assist in releasably securing a cable therein. As shown in FIG. 4, the channel and fascia engagement portion are monolithically formed. However, it should be appreciated that the first channel side may be made from a heat conductive material to allow heat transfer to the roofing materials with the second channel side and/or fascia engagement portion made from a different material. Also, the embodiment of the roof edge cable raceway of FIG. 4 may be extruded as a monolithic member or may be formed on-site by metal fabricators bending flashing as needed into the form as shown in FIG. 4. The roof edge raceway of FIG. 4 may be secured to the structure being using mechanical fasteners 98 at the fascia engagement portion 90.

Figure 5:
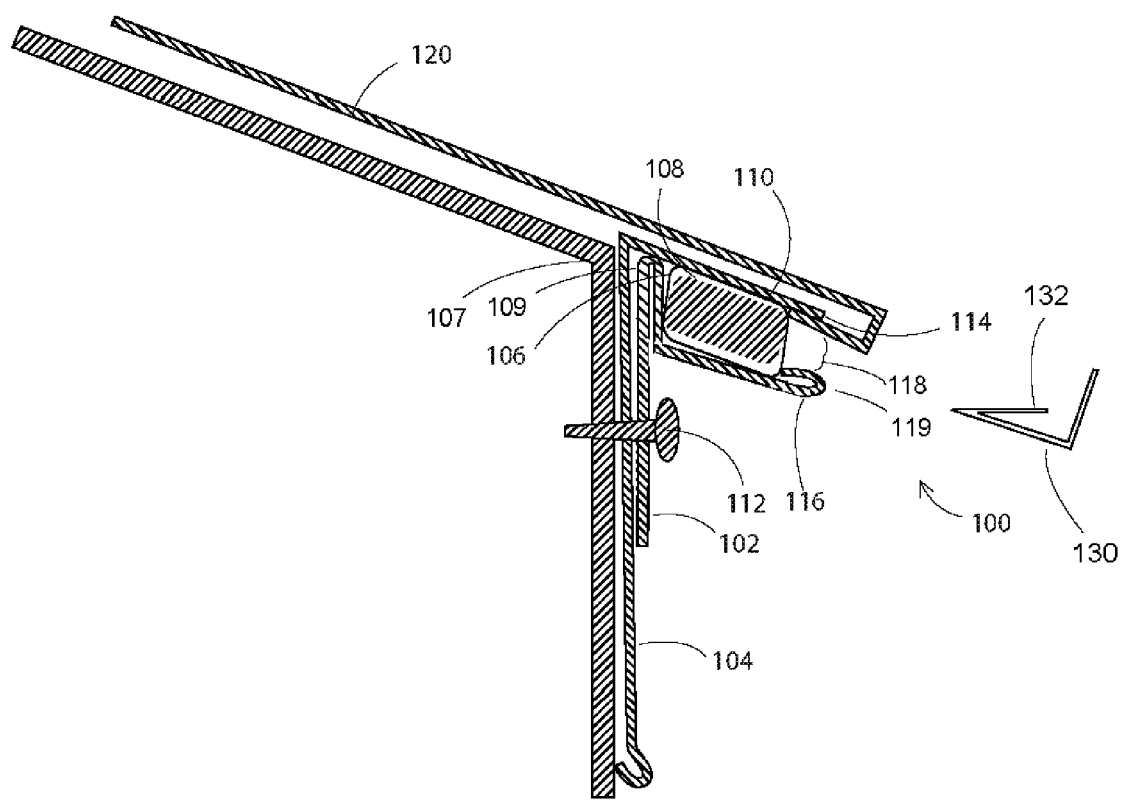
FIG. 5 is a schematic drawing showing an alternate embodiment of a roof edge cable raceway comprising an edge attachment secured to existing facia flashing provided on a structure to form a channel adapted for housing a heating cable.

FIG. 5 shows an alternate embodiment of a roof edge cable raceway 100 wherein an edge attachment 102 is assembled with existing facia flashing 104 provided on a structure in a manner to form a channel 106 at an edge 107 of the roof of the structure for accommodating a heating cable 108. As with embodiment of FIG. 2, the edge attachment 102 of FIG. 5 may be provided with a spacer 109 to assist in locating the edge attachment at a spacing corresponding to the size of the heating cable. As shown in FIG. 5, the fascia flashing 104 comprises a generally "L"-shaped member with a roof engagement portion 110. The edge attachment 102 may also comprise a member having a generally L-shaped cross-section that may be secured to the structure and/or fascia flashing 104 with mechanical fasteners 112. In the alternative, the fascia flashing and edge attachment may have a system of cooperating tabs and notches to allow the edge attachment to be positioned on the fascia flashing in a manner to create a channel sufficient to house the heating cable in a manner as described previously. As shown in FIG. 5, the roof engagement portion 110 of the existing fascia flashing 104 forms a channel first side 114, and the mounted position of the edge attachment defines a channel second side 116. Together, the channel sides define an opening 118 for the channel 106. The first channel side 114 may engage roofing materials 120, for instance, a metal roof. At least one of the sides of the channel, for instance, the side of the channel formed by the edge attachment, may be sufficiently resilient to allow it to be springably moved to allow insertion of the heating cable in the channel in a manner to allow securing the heating cable in the channel with the heating cable visible from the opening. As shown in FIG. 5, the channel second side may be provided with a large radius edge 119 to assist in providing added resiliency for the second side in snugly retaining the heating cable in the channel. The spacer 109 assists in setting the spacing to allow the heating cable to be snugly fit in the channel. The open channel of FIG. 5 also allows the heating cable to be inspected and/or replaced at a later date as needed, using one or more of the methods discussed above. Again, a snug fit ensures maximum heat transfer to the flashing and the roof structure to provide adequate melting at the roof edge. However, it should be appreciated that a biasing member may be provided in a manner as previously described in the channels to assist in releasably securing a cable therein. In the embodiment of FIG. 5, the engagement portion 110 of the fascia flashing may be made from a heat conductive material and the edge attachment may be made from a different material.

FIG. 5 also shows a cover 130 that may be provided to cover the opening of the channel and also a biasing member 132 to urge the heat cable upward in the channel. The cover 130 and biasing member 132 shown in FIG. 5 may be added to any of the channels of the preceding Figures. After the heating cable is installed, the cover 130 may be fitted into the channel so the biasing member 132 fits under the cable and pushes the cable against the roof engagement portion. Preferably, the biasing member provides a tight fit for the cable against the roof engagement portion thereby maximizing heat transfer to the roof engagement portion and drip edge. Preferably, the cover 130 and biasing member 132 are made from a heat conductive material so as to maximize heat transfer to the roof engagement portion and drip edge and to reduce the effects of air being trapped between the cable and the roof engagement portion and drip edge that may otherwise reduce the rate of heat transfer.

Figure 6:
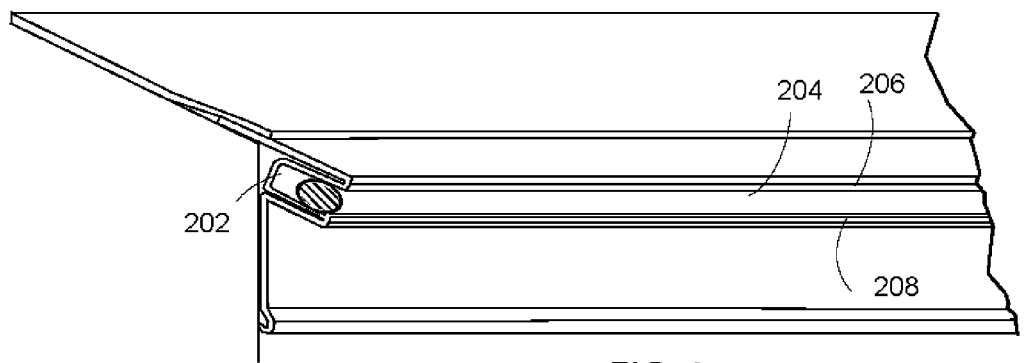
FIG. 6 is a schematic drawings showing a partial edge view of a channel formed along an edge of a roof of a structure using any one of the roof edge cable raceways shown in FIGS. 1-5 with a heating cable disposed therein.

FIG. 6 shows a schematic drawing of roof edge cable raceway 200 with an open channel structure 202 with a heating cable 204 disposed therein and channel sides 206,208 springably urged against the cable 204 to removably secure the cable in the channel.

Figure 7:
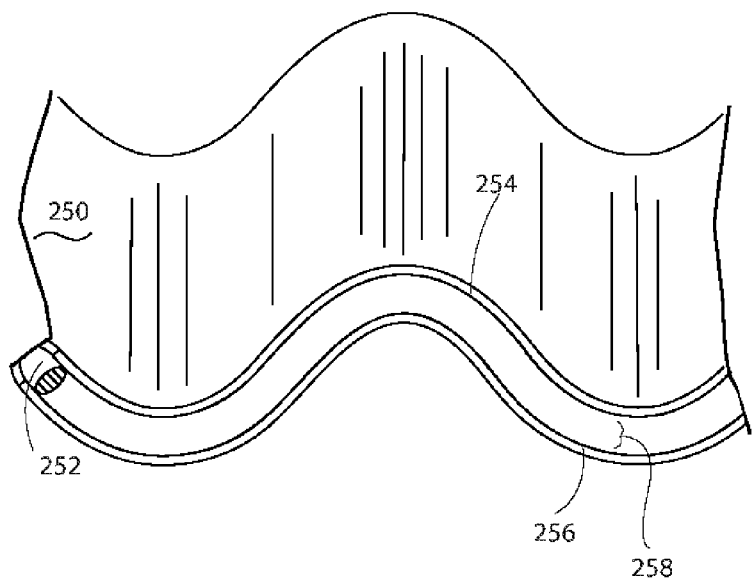
FIG. 7 is a schematic drawing showing a partial edge view of a channel formed along an edge of a corrugated roof of a structure with a curvilinear roof edge cable raceway with a heating cable disposed therein.

FIG. 7 shows a corrugated roof 250 with a raceway 252 formed on its edge for housing a heating cable 254. In the embodiment of FIG. 7, corrugated roofing materials 256 that have curved features that match the corrugated roof 250 of the structure are secured to the structure below the edge of the existing corrugated roof with a space 258 sufficient in dimension to house the heating cable 254 therebetween.

Figure 8:
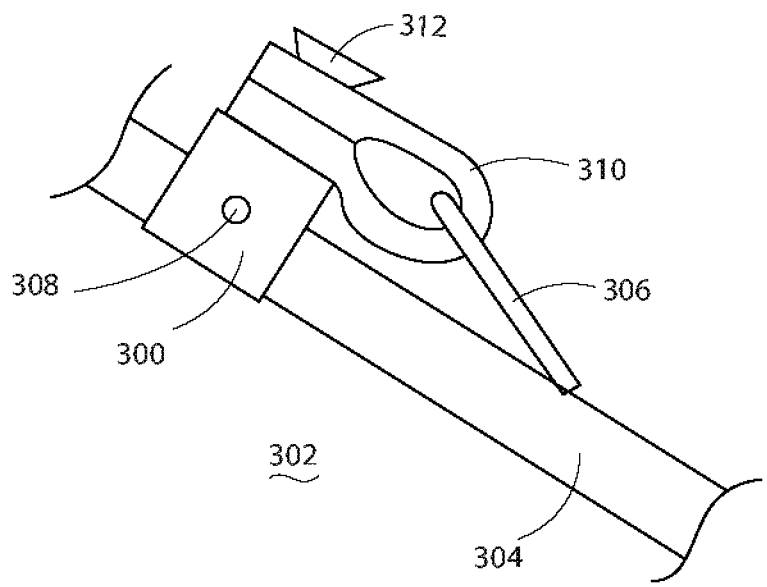
FIG. 8 is a schematic drawing of a clamping mechanism used to secure a heating cable to a point on a seam of a metal roof.

Each of the heating cables described herein may be used in connection with a roof clamp 300 in a system shown schematically in FIG. 8. Some roofs 302 have raised metal seams 304 that require protection from water leaking into the seam and penetrating the structure. Oftentimes, a heating cable 306 is extended from the drip edge up to a point on the roof past the interior wall to provide a drain path for melted snow or ice. For instance, a heating cable may extend around a fireplace or in the areas where different peaks of a roof converge. On raised seam metal roofs as shown in FIG. 8, the clamp 300 may be secured to the roof with mechanical fasteners 308. On conventional shingle or shake roofs, the clamps may be adhered to the roof with glue. A cable loop 310 is secured to the clamp with a mechanical fastener 312 with the heating cable 306 passing through the opening of the loop. The roof edge cable raceway and heating cable described herein may be used in connection with one or more of heating cable clamps 300 in the illustrative example shown in FIG. 8. Accordingly, a portion of the heating cable may exit the roof edge cable raceway channel through the opening and extend up the roof to the clamp before returning down the roof to the roof edge and back into the roof edge cable raceway channel through the opening. Thus, it is not necessary that the entire heating cable be housed in the roof edge cable raceway channel.

FIGS. 8A and 8B shows an application where a heating cable 320 is routed in the area 322 where different peaks 324 of a roof 302 converge. The cable 320 may be secured in position in the convergence of the roof peaks through a clamp 300 such as that shown in FIG. 8. Referring to FIGS. 8C and 8D, to allow the installer to affix the clamp 300 in position to properly secure the cable in position in the convergence of the roof peaks, the flashing 326 installed in the convergence of the roof peaks may be formed with a raised seam 328, thus allowing the clamp 300 to be secured to the roof vis-à-vis the flashing raised portion with a mechanical fastener 308. The raised seam may comprise a generally "U"-shaped bend in a flat flashing piece 326 thus giving the flashing a "t" shape. The flashing may comprise a "valley pan" and/or additional flashing attached to the "valley pan." The heating cable may run generally longitudinally along flashing for instance in the area 322 of FIG. 8A or FIG. 8B. In this configuration, the heating cable extends from the roof edge to the clamp 300 to form a first run of cable, and then from the clamp 300 back to the roof edge to form a second run of heating cable. An additional clamp(s) 330 with two or more cable loops 310 such as that shown in FIGS. 8C and 8D may be used to run the cable 320 as necessary, for instance, to secure the first and second runs to the flashing. A generally "U"-shaped cable keeper 332 may also be used to secure the cable to the clamp instead of multiple cable loops. In the alternative, the bend in the flashing may extend along a width of the flashing to allowing installing the cable at other positions on a roof, for instance, adjacent the dormers shown in FIG. 8A. A single loop and clamp may used where there the first and second runs of cable are spaced apart or if there is only a single run of heating cable. Instead of or in addition to the additional clamps 330 of FIGS. 8C and 8D, a cover 340 may be used to cover a run(s) of heating cable. As shown in FIG. 8E, the cover 340 may have a generally "U"-shaped cross section, and may attach to the clamp 300 through the common cable loop fastener 312 directed through a hole 342 in a top surface 344 of the cover or with another fastener connectable with the clamp. The cover may have side walls 346 to confine the cable runs within an interior 348 of the cover thereby protecting the cables and providing a more aesthetic appearance for the roof. The cover may also comprise a flat flashing member.

In addition to using a cover on raised seam of a valley pan as shown in FIGS. 8A-8E, a cover 3340 may also be used in connection with cable runs extending adjacent raised seams of a roof, for instance, a metal roof. FIGS. 8F through 8J illustrate different embodiments of arranging a cable (preferably a heating cable) at or adjacent to a raised seam 3328 of a metal roof 3302. In a heating or ice melt application, the heating cable 3320 heats the area around the raised seam 3328, thereby preventing ice dam formation in and around the raised seam area. The heating cable (or runs of cable) may be covered with the cover to retain the heating cable(s) in abutting arrangement with the raised seam 3328 and to provide an aesthetically pleasing arrangement for the raised seam metal roof. Additionally, by providing a cover which is releasably attached to the raised seam, the cover may be removed as necessary to expose the cable for inspection and/or replacement.

FIG. 8F shows an arrangement comprising a metal roof 3302 with a raised seam 3328 with a heating cable 3320 positioned atop the raised seam. The heating cable is held in place with a cover 3340, which is pressed over the heating cable and raised seam in the direction of the arrow to provide an aesthetically pleasing arrangement for the metal roof. As stated before, the cover 3340 may have side walls 3346 and a top surface 3344 forming a generally "U" shaped cross section with an interior 3348. In the embodiment of FIG. 8F, the interior 3348 forms an internal channel, and in the embodiment of FIG. 8F the internal channel is dimensioned to fit both the cable 3320 and also a portion of the raised seam 3328. As stated previously, the cover 3340 may be releasably attached to the raised seam 3328 to allow the cover to be removed for inspection and/or replacement of the heating cable. In one embodiment, the cover may be provided with a plurality of internal barbs 3350 extending in a spaced fashion longitudinally in the interior 3348 along the side walls 3346 of the cover. The barbs springably extend from the side walls into the interior so as to be urged against and engage lateral sides 3351A,3351B of the raised seam 3328 to hold the cover in place. The barbs may also frictionally engage the lateral sides of the raised seam. In the alternative to or in addition to, a clamp 300 as shown in FIGS. 8C through 8E may be used to secure the cover to the raised seam adjacent to or at the ridge portion of the roof.

FIG. 8G is an alternate configuration to that shown in 8F where one run of heating cable 3320A is positioned on the first side 3351A of the raised seam 3328 and a second run of heating cable 3320B is positioned on a second, opposite side 3351B of the raised seam 3328. As stated before, a cover 3340 is placed over the runs of cable and the raised seam to provide an aesthetically pleasing arrangement for the roof while maintaining the cables in abutting contact with the raised seam. The cover in FIG. 8G may be provided without a system of internal barbs, and may be held in place with a clamp 300. As with the embodiment of FIG. 8F, the cover 3340 of FIG. 8G also has an interior 3348 that forms an internal channel, and in the embodiment of FIG. 8G the internal channel is dimensioned to fit both the cable runs 3320A,3320B, and also at least a portion, and preferably all, of the raised seam 3328.

FIG. 8H shows an alternate embodiment to the arrangement of FIGS. 8F and 8G wherein the cover 3340 is provided with extended flank portions 3352 extending transverse to the side walls 3346 of the cover. Each of the extended flank portions 3352 of the cover have a raised portion 3353 forming an internal channel in their midsections sized to accommodate a heating cable 3320A,3320B. The ends of the portions 3352A,3352B may be angled upwards slightly. The angling allows the cover to be installed and the cable inserted into the raised portion as may be desired depending upon the installation techniques used. The angling also allows the cable to partially visible when the cable is seated in the raised portion 3353 with the cover installed thereby allowing the cable to be inspected after installation.

In the embodiment shown in FIG. 8H, the heating cables may be moved away from side walls of the raised seam and held in place with the cover in abutting contact with the roof 3302. The cover 3340 of FIG. 8H may frictionally engage the side walls of the raised seam and/or may be held in place with a clamp as previously described.

While FIG. 8H shows a cover 3340 as a monolithically formed member with the flank portions 3352 extending transversely to the "U"-shaped cover sidewalls 3346, FIG. 8I shows an alternate embodiment where the cover 3340 may comprise a generally "L"-shaped piece. An upstanding portion 3354A of "L"-shaped cover piece may be positioned adjacent a first lateral side wall 3351A of the raised seam and an upstanding portion 3354B of the second "L"-shaped cover piece may be positioned adjacent the opposite lateral side wall 3351B of the raised seam. Portions 3352 of the cover 3340 have a raised portion 3353 forming an internal channel in their midsections sized to accommodate a heating cable 3320A,3320B. In such an arrangement, the portions 3352 of the "L"-shaped cover piece may abut and contact the roof 3302. The cover 3340 may be held in place secured to the raised seam 3328 with a clamp 3300 as previously described. The ends of the portions 3352A,3352B may be angled upwards slightly. The angling allows the cover to be installed and the cable inserted into the raised portion as may be desired depending upon the installation techniques used. The angling also allows the cable to partially visible when the cable is seated in the raised portion 3353 with the cover installed thereby allowing the cable to be inspected after installation.

In FIG. 8J, two runs of heating cable 3320A,3320B are positioned on one lateral side 3351B of the raised seam within a cover 3340. In the embodiment shown in FIG. 8I, the cover may be provided with internal barbs 3350 on one side of the cover to engage the lateral side wall 3351A of the raised seam opposite the side with the cables. The cover of FIG. 8J has an interior 3348 that forms an internal channel, and in the embodiment of FIG. 8J, the internal channel is dimensioned to fit both the cable runs 3320A,3320B, and also a portion of the raised seam 3328.

FIG. 8K is a further alternate configuration where two runs of heating cable 3320A,3320B are positioned on one lateral side 3351B of the raised seam. One run of heating cable 3320A is positioned on an exposed lower edge 3356 of the cover and a second run 3320B is positioned below the exposed lower edge of the cover. As shown in FIG. 8J, the lower edge 3356 of the cover may be formed into an internal channel to contain one run of the heating cable. The cover 3340 may be biased downward against the surface of the roof 3302 such that the exposed lower edge of the cover biases the second run 3320B of heating cable against the roof. Internal barbs 3350 provided on the cover may engage the side walls 3351A,3351B of the metal seam roof and urge the cover downward to hold the second run of cable against the metal roof. In the arrangement shown in FIG. 8J, the heating cables are exposed allowing them to be rapidly inspected as necessary.

Figure 9:
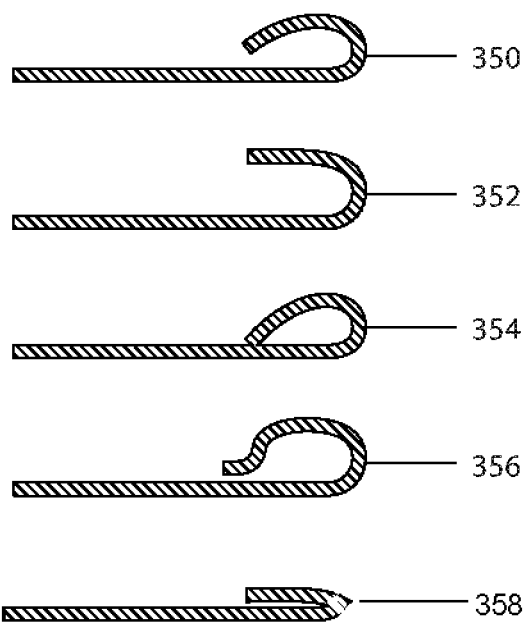
FIG. 9 shows alternate embodiments of radiuses for sides of the channel or end edges of any of the edge attachments described herein.

FIG. 9 shows alternate embodiments of radius styles that may be provided on one or more of the sides of the channel for added resiliency to springably retain and/or removably secure the heating cable in the channel. The radius or hem style may also be provided on the edge of any of the edge attachments, fascia mounting portions, or roof engagement portions. For instance, the edge attachment comprising a generally "L"-shaped cross section may have a distal edge folded back onto itself with a radius in one of the exemplary styles 350,352, 354,356,358 thereby forming a channel second side with added resiliency. As mentioned previously, providing one or more channel sides with a radiused edge facilitates installation, although one or more of the channel side may be flat. The distal end of the fascia mounting portion may also have a radius edge in one of the exemplary styles 350,352,354,356, 358 to direct drainage away from the structure.

Figure 10:
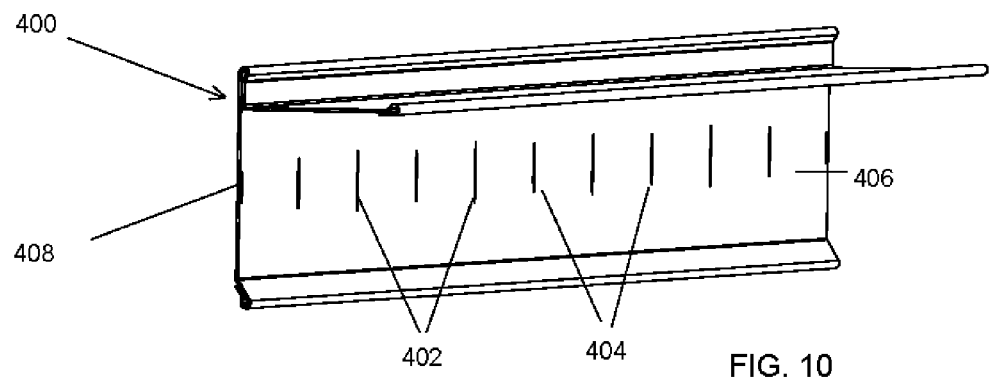
FIG. 10 shows a partial perspective view of an alternate embodiment of an edge attachment which may be used to form the roof edge cable raceway of FIGS. 1,2, and 5.
Figure 11:
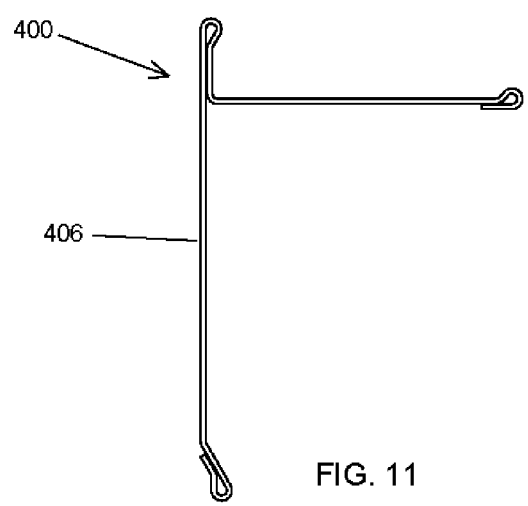
FIG. 11 shows a cross sectional view of the edge attachment of FIG. 10.
Figure 12:
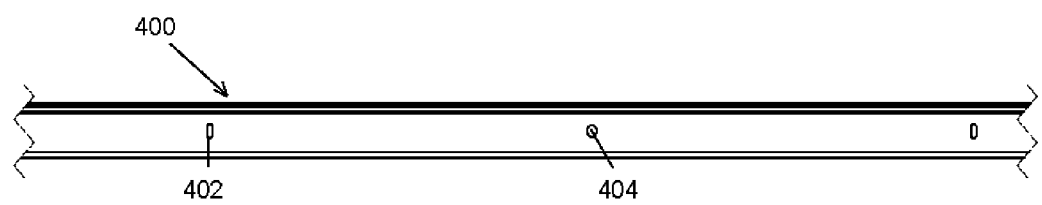
FIG. 12 shows a partial front view of the edge attachment of FIG. 10.

FIGS. 10-12 show an alternate embodiment of an edge attachment 400 that may be used in connection with the cable raceways of FIGS. 1,2, and 5. The edge attachment 400 may comprise a generally L-shaped cross section as described above and used with a roof drip edge having a slight pitch. The edge attachment may be extruded and made from a heat conductive material as described above. FIG. 12 shows an embodiment where a system of vertically elongated adjustment slots 402 and pilot holes 404 may be provided on a vertical member 406 portion of the edge attachment. The vertical adjustment slots 402 allow an installer to mount the edge attachment 400 loosely to the fascia, for instance, through the drip edge fascia mounting portion or fascia flashing as the case may be, install the heating cable in the raceway channel, and then make the final fit up and adjustment to springably retain the cable in the channel. A connection hole 408 (for instance, a vertical adjustment slot or pilot hole) may also be provided at each end of the edge attachment to allow adjacently mounted edge attachments to be overlapped and connected to the fascia with a common mechanical fastener. The pilot holes 404 allow the installer to lock each respective length of edge attachment in place against the fascia and thereby determine the final channel width. The pilot holes eliminate the potential for a length of the edge attachment to slip down the vertical elongated slot from expansion and contraction of the edge attachment and mechanical fastener located in the vertical elongated slot. As mentioned previously with respect to FIG. 2, a spacer 410 may be integrally formed on the edge attachment 400 to assist in locating the edge attachment at the proper spacing to form the channel opening to accommodate the heating cable as may be desired, for instance, after installation of the edge attachment, the cable may be inserted in the raceway.

Figure 13:
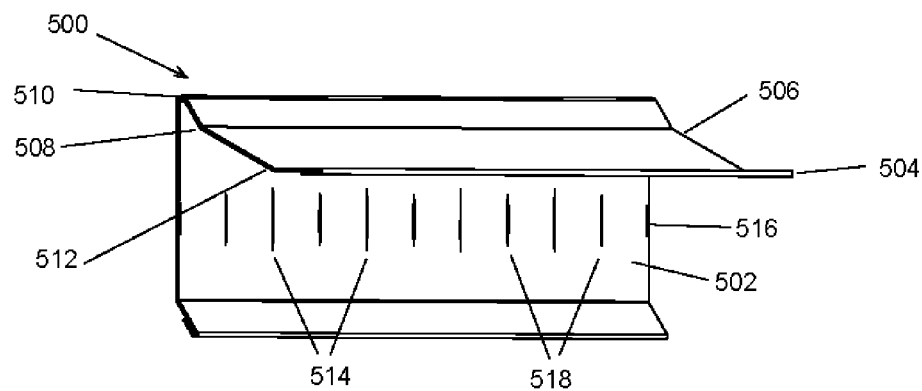
FIG. 13 shows a perspective view of a further alternate embodiment of an edge attachment which may be used to form the roof edge cable raceway of FIGS. 1,2, and 5.
Figure 14:
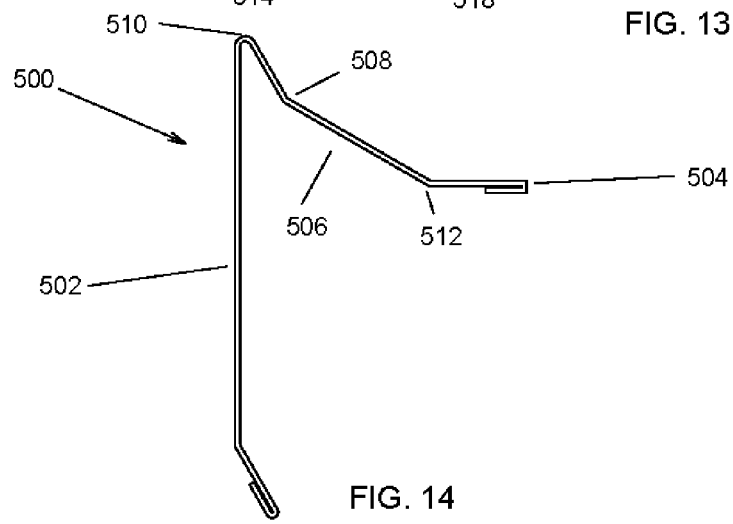
FIG. 14 shows a cross sectional view of the edge attachment of FIG. 13.
Figure 15:
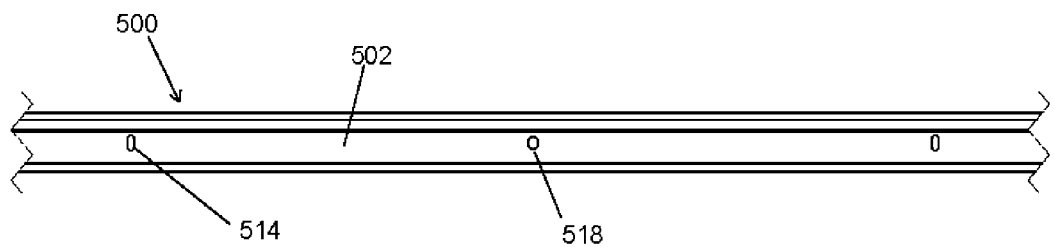
FIG. 15 shows a partial front view of the edge attachment of FIG. 13.

FIGS. 13-15 show a further alternate embodiment of an edge attachment 500 that may be used in connection with the cable raceways of FIGS. 1, 2, and 5. The edge attachment may be adjustable to allow the edge attachment to be used with a roof drip edge having many different roof pitches. For instance, the edge attachment shown in FIGS. 13-15 may comprise a "V"-shaped member to allow it to be adjustable. Other cross-sectional arrangement may also be used. The "V"-shaped cross section comprises a web member 502, a support member 504 that may abut the heating cable disposed in the raceway channel, and an adjustment member 506 extending between the support member and the web member. Preferably, the adjustment member 506 is resiliently deformable allow the "V" shaped cross section to be bent by the installer to fit each individual job or by the manufacture to order, thus allowing a manufacturer to have one shape in stock but meet many different applications. The "V"-shaped cross section as shown in FIGS. 13-15 may be used with a range of roof pitches from 0:12 to 12:12. As shown in FIG. 14, the web member 502 may be generally vertically oriented, the support member 504 generally horizontal or transverse to the web member, and the adjustment member comprising at least one bend line 508 to allow the adjustment member to be resiliently deformed. Bending may occur at one or more of the bend line(s) 508, the coterminous edge 512 of the adjustment member and the support member, and/or the coterminous edge of the adjustment member and the web member 510. An installer may place the edge attachment in a conventional brake and rotate the adjustment member 506 and the support member 504 as desired along the bend line 508, the bend line 510, and/or the bend line 512 as desired depending upon the pitch of the roof. As with the embodiment of FIGS. 10-12, a system of vertically elongated adjustment slots 514, connection slots 516 (i.e., an adjustment slot at an end of the edge attachment), and pilots holes 518 may be provided in the web member 502 of the edge attachment. Also, a spacer 520 may be integrally formed on the edge attachment 500 to assist in locating the edge attachment at the proper spacing to form the channel opening to accommodate the heating cable as may be desired, for instance, after installation of the edge attachment, the cable may be inserted in the raceway.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed were meant to be illustrative only and not limited as to the scope of the invention which is to be given the full breadth of the appended claims and any equivalents thereof.

What is claimed is:

1. A method comprising:
on a roof having a raised seam, extending a first run of cable in a direction generally parallel to the raised seam;
accessing a cover having an channel dimensioned to receive the cable therein;
installing the cover on the roof at the raised seam; and
securing the cable in the internal channel of the cover in a manner such that the cover retains the heating cable in abutting arrangement with the raised seam along substantially the entirety of the run of cable.

2. The method of claim 1 wherein the channel is dimensioned to receive the cable and at least a portion of the raised seam.

3. The method of claim 1 further comprising securing the cover to the roof with a clamp secured to the raised seam.

4. The method of claim 1 wherein the cover has an interior surface with springing portions that are biased against the raised seam when the cover is installed on the roof.

5. The method of claim 1 wherein the cable is a heating cable.

6. The method of claim 1 wherein in the roof is metal.

7. The method of claim 1 wherein the cover is generally "L"-shaped.

8. The method of claim 1 wherein the a portion of the cover abuts a side wall of the raised seam and another portion of the cover abuts the roof.

9. A method comprising:
on a roof having a raised seam, extending first and second runs of cable in a direction generally parallel to the raised seam;
accessing a cover having at least one channel dimensioned to receive at least one of the first and second cable runs therein;
installing the cover on the roof adjacent to the raised seam; and
securing at least one of the first and second runs of cable in the internal channel of the cover in a manner such that the cover retains the heating cable in abutting arrangement with the raised seam along substantially the entirety of the at least one of the first and second runs of cable.

10. The method of claim 9 wherein the at least one channel is dimensioned to receive the first and second runs of cable and at least a portion of the raised seam.

11. The method claim 10 wherein the first run of cable abuts one lateral side of the raised seam and the second run of cable abuts an opposite lateral side of the raised seam.

12. The method of claim 9 further comprising securing the cover to roof with a clamp secured to the raised seam.

13. The method of claim 9 wherein the cover has an interior surface with springing portions that are biased against the raised seam when the cover is installed on the roof.

14. The method of claim 13 wherein the springing portions are disposed in the at least one channel.

15. The method of claim 9 wherein the cable is a heating cable.

16. The method of claim 9 wherein in the roof is metal.

17. The method of claim 9 wherein the cover is generally "L"-shaped.

18. The method of claim 9 wherein the a portion of the cover abuts a side wall of the raised seam and another portion of the cover abuts the roof.

* * * * *